Jan. 12, 1926.

J. L. DIXON

ELECTRIC ARC FURNACE

Filed Sept. 5, 1919

1,569,463

INVENTOR,
JOSEPH L. DIXON,
BY
Kerr, Page, Cooper & Hayward
ATTORNEYS.

Patented Jan. 12, 1926.

1,569,463

UNITED STATES PATENT OFFICE.

JOSEPH L. DIXON, OF NEW YORK, N. Y., ASSIGNOR, BY MESNE ASSIGNMENTS, TO PITTSBURGH RESEARCH CORPORATION, OF PITTSBURGH, PENNSYLVANIA, A CORPORATION OF DELAWARE.

ELECTRIC-ARC FURNACE.

Application filed September 5, 1919. Serial No. 321,803.

*To all whom it may concern:*

Be it known that I, JOSEPH L. DIXON, a subject of the King of Great Britain, residing at New York, in the county and State of New York, have invented certain new and useful Improvements in Electric-Arc Furnaces, of which the following is a full, clear, and exact description.

The invention which forms the subject of this application for Letters Patent is an improvement in the art of melting and refining metals and the like by means of electric arcs established between vertical electrodes and the metal itself.

In another application of even date herewith, Serial No. 321,804, I have set forth and claimed a process and apparatus by means of which a metal, as steel, is refined by arcs formed by electric energy supplied to a plurality of electrodes at unequal voltages, and the advantages of such a process are elaborated. The improvement which I shall describe herein, has for its primary objects to provide more practicable means by which these unequal voltages may be supplied to the electrodes of such an electric furnace, while the load on the primary electric supply system remains balanced.

For carrying out the stated objects of this invention I have designed a three phase transformer which is capable of delivering to the electrodes unequal voltages, and which furthermore is so arranged that these voltages may be adjusted independently of each other.

Figure 1:
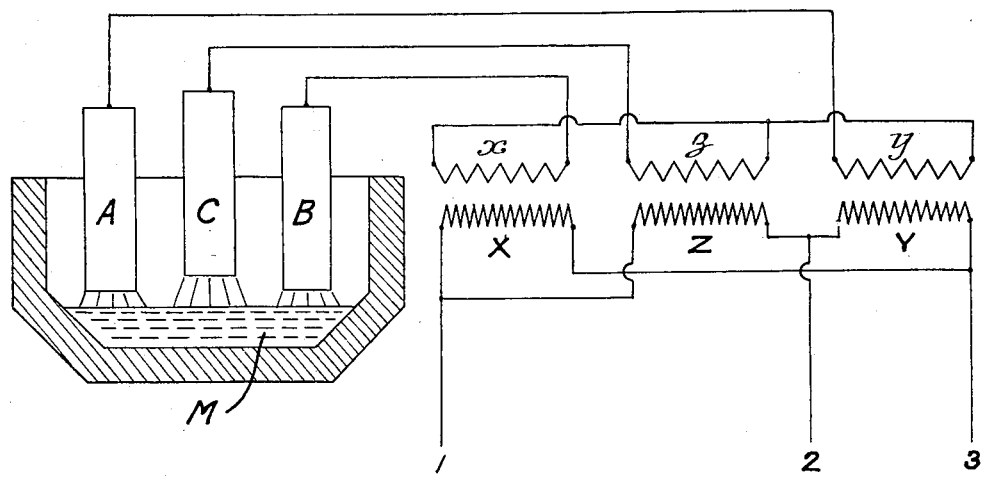
Figure 2:
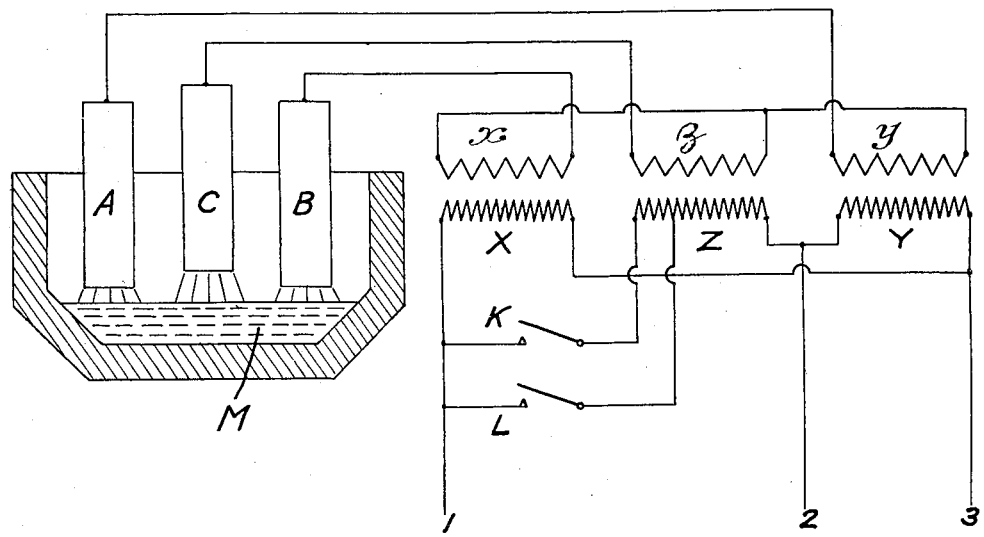

This improvement is illustrated diagrammatically in the accompanying drawing in which Fig. 1 shows the system with one form of transformer constructed in accordance with my invention, and Fig. 2 is a similar view showing a modification of the transformer.

In Fig. 1, 1, 2 and 3 represents the primary mains or leads of a three phase system to a transformer. The primary windings of the latter are designated by X, Y and Z and the secondaries by $x$, $y$ and $z$. From these latter lead the mains D, E and F to an electric furnace M having three upper electrodes A, B, C, adapted to form arcs onto the bath of metal contained in the furnace.

In order that the voltages between each of the electrodes and the bath shall have unequal values, I construct the transformer so that the three transformer ratios $Xx$, $Yy$ and $Zz$ shall have unequal values.

It must not be assumed that the relationship of the voltages between the electrodes A, B, C and the bath, is exactly the same as that between the various transformer ratios. For example, if the transformer windings $Zz$ have a ratio equal to one-half of each of the ratios $Xx$ and $Yy$, so that the voltage induced in the winding $z$ is twice that induced in each of the windings $x$ and $y$, the voltage between the electrode B and the bath of metal will not be twice that between each of the other electrodes A and C and the bath, but will be quite different from this.

Let it be assumed, for purposes of illustration that the voltage between the electrode B and the bath expressed percentages of the voltage between the other electrodes A and C and the bath has, in turn, the following values: 25%, 50%, 75%, 100%, 125%, 150%, 175%, 200%. Then the corresponding voltages which must be induced in the secondary winding $z$, expressed in percentages of the voltage in each of the windings $x$ and $y$ are respectively as follows—correct to the nearest whole number: 52%, 68%, 84%, 100%, 117%, 134%, 152%, 172%.

In most metallurgical operations it is not always desirable that the electrode voltages shall be of the same ratios throughout the process, and hence, it is desirable that some means be provided for adjustably varying such voltages without suspending or delaying the operation.

For this purpose I have devised the means shown in Fig. 2 for varying the ratios between the electrode voltages. The apparatus shown in this figure is the same as that shown in Fig. 1 with the exception that two switches K, L, are shown as included in a portion of one of the primary circuits as Z. With switch K closed and switch L open, the ratio of the transformer has a value different from its value when the switch L is closed and the switch K is open. By the alternate closing of switches K, L, the ratio of the transformer windings $Zz$ is raised or lowered and therefore the voltage between the electrode K and the bath is lowered or raised, but, as I have related, not in the same proportion as the voltage of the secondary transformer winding $z$.

It is obvious that instead of or in addition to the switches K, L, by means of which the transformer $Zz$ is controlled, there may be similar switches connected to one or both of the transformers $Xx$ and $Yy$.

Another advantage which results from the construction above described is that in addition to the fact that it brings about an improvement in the process during the refining stage, it provides a means by which the voltages of the electrodes may be manipulated as to accelerate the melting of the material in the charge. Either accidentally or through deliberate design, for example, in charging the furnace, one part of the charge of cold material might resist fusion to a greater extent than other parts. In such case, it is desirable to increase the voltage of the electrode nearest the more infusible part of the charge. Such increased voltage in itself accelerates the melting but the increased speed of melting is also largely due to the increased energy supplied to the furnace, by the electrode with the higher voltage.

Assuming that the electrodes are so manipulated that the load on the primary supply mains is balanced, then when the voltage of one of the electrodes relative to the voltage of each of the others is expressed in the following percentages: 25%, 50%, 75%, 100%, 125%, 150%, 175%, 200%, the energy introduced by this electrode when compared with the energy introduced by each of the other electrodes, is 32%, 59%, 82%, 100%, 115%, 130%, 138%, 146%.

It is, therefore, possible by means of a proper manipulation of the secondary voltage, to accelerate the melting in one part of the charge and relatively retard it in others. In furnaces as constructed and operated heretofore, this is not possible without unbalancing the primary electric supply system.

What I claim is:

1. In a system of the kind described, the combination with an electric furnace of three upper electrodes and a transformer of three phase alternating currents having transformer ratios of unequal values in the several phases, and supplying said electrodes with currents of different voltage.

2. In a system of the kind described, the combination with an electric furnace having three electrodes supplied with three phase alternating currents from transformers, of transformers connected with the electrodes and means for adjusting the ratios of the primary and secondary windings of said transformers whereby the voltages of the electrodes may be varied independently of each other.

3. In a system of the kind described, the combination with an electric furnace of three electrodes, a three phase transformer connected with and supplying current to said electrodes only, without the use of a neutral connection, and means for varying the relative voltages delivered to the electrodes independently of each other.

4. In a system of the kind described, the combination with an electric furnace having a plurality of arcing electrodes, of a polyphase transformer for supplying current to said electrodes, and switching means for changing the ratio of the primary and secondary windings of one phase of said transformer independently of the others, whereby the voltage impressed upon the corresponding electrode may be individually varied without affecting the others.

5. In a system of the kind described, the combination with an electric furnace having three arcing electrodes, of a three phase transformer having primary and secondary windings for supplying said electrodes with current, one set of windings of said transformer being connected in delta, and switching means associated with the delta connected windings for varying the ratio of the primary and secondary windings of one phase of said transformer independently of the others.

In testimony whereof I hereunto affix my signature.

JOSEPH L. DIXON.